Aug. 11, 1964   G. F. AROYAN ETAL   3,144,555
RETICLE STRUCTURE FOR INFRA-RED DETECTING SYSTEM
Filed June 8, 1962   4 Sheets-Sheet 1

GEORGE F. AROYAN
STANTON H. CUSHNER
INVENTORS

BY
*Benjamin DeWitt*
ATTORNEY

Aug. 11, 1964    G. F. AROYAN ETAL    3,144,555
RETICLE STRUCTURE FOR INFRA-RED DETECTING SYSTEM
Filed June 8, 1962    4 Sheets-Sheet 2

GEORGE F. AROYAN
STANTON H. CUSHNER
INVENTORS

BY
*Benjamin LeWitt*
ATTORNEY

Aug. 11, 1964 G. F. AROYAN ETAL 3,144,555
RETICLE STRUCTURE FOR INFRA-RED DETECTING SYSTEM
Filed June 8, 1962 4 Sheets-Sheet 3
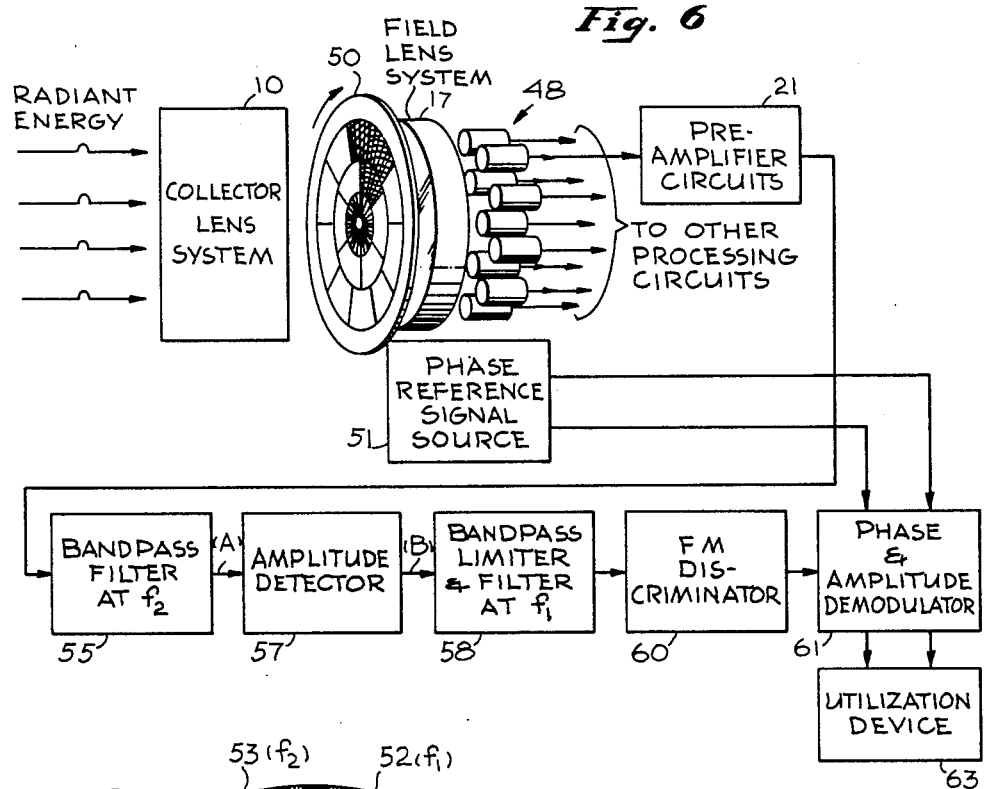
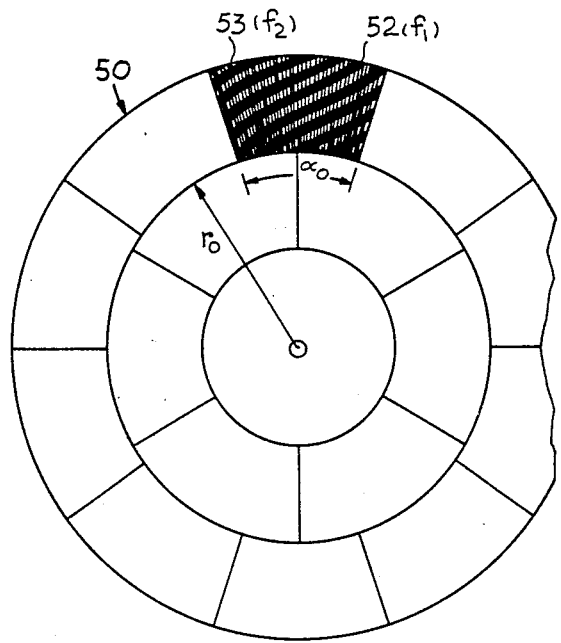
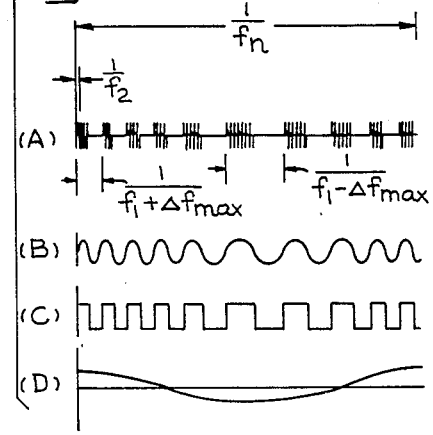
INVENTORS
GEORGE F. AROYAN
STANTON H. CUSHNER
BY
Benjamin DeWitt
ATTORNEY

GEORGE F. AROYAN
STANTON H. CUSHNER
INVENTORS

United States Patent Office 3,144,555
Patented Aug. 11, 1964

3,144,555
RETICLE STRUCTURE FOR INFRA-RED
DETECTING SYSTEM
George F. Aroyan, Woodland Hills, and Stanton H. Cushner, Los Angeles, Calif., assignors to Space Technology Laboratories, Inc., Redondo Beach, Calif., a corporation of Delaware
Filed June 8, 1962, Ser. No. 201,076
11 Claims. (Cl. 250—83.3)

This invention relates to radiant energy detecting systems and more particularly to a new and improved radiant energy system using optical chopping and spatial filtering techniques.

In radiation receiving systems, it is well known that the radiation from an object may be collected and an electrical signal corresponding to the intensity of the received radiation may be generated by some suitable transducer. Although the novel apparatus of the present invention finds particularly useful application in systems responsive to electromagnetic radiation falling within the spectrum of infrared or visible light, the novel features of the present invention are also of advantage in systems operating in response to other forms of radiant energy, including both visible and invisible light rays, infrared energy, and radio frequency waves. Accordingly, the term "optical," often employed as descriptive of visible light processing systems, will, as used herein, be construed as being also descriptive of systems for collecting, directing, refracting, transducing, and detecting all forms of radiant energy including, but not limited to, that constituting visible light. Furthermore, it will be understood that the description of the principles of the present invention as given below in terms of a specific form of radiant energy, such as visible light, is by way of example only and that the invention may be applied as well to systems responsive to other forms of radiant energy.

In most radiation detection systems employed for detecting and determining the position and movement of an object with respect to a given point of observation, the space in which such an object or target may be present is systematically examined by an electro-optical system which collects radiation from a predetermined field of view. Such an electro-optical system generally employs combinations of optical elements such as mirrors and lenses and is designed to be responsive on a selective basis to only that energy which is collected within the predetermined field of view. The response pattern of such a system is generally representable as a solid cone extending into space, with the apex of the cone being positioned at the point of observation. The predetermined field of view, or response pattern, is generally referred to as the "instantaneous field of view" or sometimes "field of view" of the collection apparatus. The optical axis of the system, as projected into space, is, in most cases, centrally disposed within the instantaneous field of view so that the optical axis of the system is in geometric coincidence with the axis of the conical response pattern of the apparatus.

The energy collected within the instantaneous field of view of the above-described electro-optical system may be directed to an energy-sensitive cell which develops an electrical output signal representing the intensity of the radiant energy collected within the field of view. In accordance with certain prior art techniques, a circular disc-like chopping reticle is positioned within the electro-optical system at an image or focal plane. Such a reticle is rotated about its axis in interrupting relation to the radiation collected by the system so as to "chop" the radiation as it is directed to the sensitive cell. This type of reticle, also known as an episcotister, is generally called a "chopping" reticle because it is comprised of a pattern of carefully dimensioned alternate areas of relative opacity and transmissivity to the energy or radiation collected by the system. The shape of each of these areas often conforms to that of a sector of a circle. The areas of relative transmissivity defined between adjacent areas of relative opacity on the reticle pattern are sometimes called "reticle apertures" because it is through these openings or apertures, that radiant energy is permitted to reach the energy-sensitive cell. As the reticle is rotated at a selected angular velocity, the reticle apertures move within the focal plane and modulate the energy reaching the energy-sensitive cell. As a consequence, the cell produces an output signal including alternating current components having frequencies related to both the number of reticle apertures and the rotational velocity of the reticle.

In general, the detection of the presence of a radiant energy emitting source within the field of view is sensed during a searching mode of operation, and once the presence of such an object has been established, a tracking mode of operation takes place in which the radiation-emitting source is maintained within the field of view. During the searching mode of operation, the entire electro-optical system may be mechanically driven to execute a systematic scanning action which results in the exploratory examination of a volume of space many times greater than the instantaneous field of view. Upon the sensing of the presence of a radiant energy emitting source or target within the field of view, the electro-optical system may be switched to a tracking mode of operation in which electrical signals derived from the radiation-sensitive cell are employed to control a servo system by means of which the electro-optical system is maintained in alignment with the radiation-emitting source and corrective signals are applied to the servo system so that the electro-optical system as a whole follows the selected source or target as it moves through space. The tracking mode of operation is achieved in most prior art radiation receiving systems through arbitrary modulation of incident radiation in the focal plane of the optical system and the subsequent demodulation of the detected signal at the output of the radiation-sensitive cell. The signal may have been modulated in one of several common characteristic modulations, such as amplitude modulation, frequency modulation, pulse width modulation, etc. The modulated signal is generated by virtue of the fact that the object is imaged in a focal plane at the rotating reticle and the image of the object is caused to move in a circular path within the focal plane, or, in the alternative, the rotational axis of the reticle is caused to revolve around the image in the focal plane, and the radiation from the object is thereby chopped or modulated in passing through the reticle at a variable rate. As a result, a component of the radiation-sensitive cell's output signal is modulated in a predetermined manner by either the variation in spoke spacings or by variation of the angular velocity of the reticle relative to the image. By comparing the phase of a frequency modulation signal with a reference signal, for example, the angular coordinate of the target in a set of reference polar coordinates may be ascertained. Similarly, the magnitude of the frequency deviation is a measure of the polar radius in the same set of coordinates. From this information, the servo control system may be brought into action to track or follow any motion of the source or target through space.

For an understanding of the manner in which the particular pattern of a reticle may aid the revelation of information contained in a given field of view in a radiant energy detection system, reference may be made to an article by George F. Aroyan, entitled "The Technique of Spatial Filtering," published in the Proceedings of the IRE, September 1959, pages 1561 to 1568. As set forth in the article, distribution of energy across an object or image can be expressed mathematically as a function of inverse space, which generally speaking may be related to size, and may be described and analyzed in terms of "space frequency." Furthermore, space filtering by means of a reticle may be arranged so as to highlight the detail of particular objects or images at the expense of background noise.

The manner in which many of the disadvantages of prior art systems may be overcome through use of a particular reticle pattern is disclosed in the abovementioned article. One specific reticle pattern suggested by that article incorporates involute spokes having a substantially constant degree of arc to obtain maximum space-frequency discrimination of point objects, irrespective of their position in the field of view. However, even with such a reticle it has been difficult to discriminate against certain types of background energy. For example, when a background pattern contains a source of radiant energy in a line configuration having an orientation which is substantially unaffected by the chopping action of the reticle, the line source can effectively obscure point sources which the system would otherwise detect. Thus if one or more extended line sources are parallel to the direction of the spokes of a reticle, the result is a lack of effective discrimination.

The ability to discriminate against extended line sources of any orientation may be spoken of as an ability to provide two-dimensional space filtering. An ability to effect two-dimensional space filtering also connotes an ability to identify extended line sources under different circumstances, and to analyze the size and shape of sources. Directly related to the problem of determining the size and orientation of a radiant energy source is the problem of optimizing the characteristics of a system for detection of particular sources. Systems in accordance with the invention thus may be regarded as optical analyzers, which function to provide a measure of the operating characteristics of radiant energy equipment itself, or function to analyze specific parameters, such as image quality, relative object size, or object orientation.

It is therefore an object of the present invention to provide an improved radiant energy detection system which is capable of providing two-dimensional space filtering.

Another object of the present invention is to provide an improved infrared detection system, which may be arranged to provide discrimination against extended line sources of any orientation.

Another object of the present invention is to provide an improved system for analyzing the characteristics of optical equipment.

In accordance with one aspect of the present invention, a single reticle having a plurality of different radiation modulating patterns may be employed in a radiant energy detection system. By way of example in a system in accordance with the invention, the reticle which is employed may use superimposed patterns which effectively modulate or chop received radiation simultaneously in at least two different time frequencies corresponding to two different spatial frequencies. The spokes of the two patterns lie at oblique angles to each other, so that each discriminates against line sources lying in a different direction. Only radiation arriving from substantially point sources is chopped at the two different frequencies.

The radiation passed by the reticle is sensed by a detector which produces a corresponding electrical signal. By successive time domain filtering of the electrical signal, first at the higher frequency, and then at the lower frequency, an output signal is derived representing substantially only point sources of radiation.

An example of an optical analyzer in accordance with the invention is provided by a system using a reticle which is segmented into different space frequency patterns each providing the same chopping frequency. The sectors of the reticle are sequentially introduced in the field of view, and the space frequency content is measured at the several distinct space frequencies. Although the time or chopping frequency remains the same from sector to sector about the reticle, the space frequency which is reinforced changes progressively with the sectors. By sampling the electrical signals derived from the detector during successive time intervals, there is made available for analysis a measure of the quality and amount of signal degradation at each space frequency.

In another system in accordance with the present invention, an areally subdivided reticle and a mosaic of detectors are employed. Each areal subdivision of the reticle contains at least two superimposed space frequency patterns. By subsequent successive time domain filtering of the signals derived at the individual detectors through the sequentially presented subdivisions of the reticle, the locations of specific point sources within the field of view may be identified with high accuracy, although the system utilizes only one moving part (the reticle).

A better understanding of the invention may be had by reference to the following description, taken in conjunction with the accompanying drawings, in which:

FIGURE 1 constitutes a simplified block diagram and partial perspective representation of a generalized form of radiant energy analyzing system using a multiple frequency reticle;

FIG. 6 is a combined block diagram and perspective view of a track-while-scan system using an areally subdivided reticle and a mosaic of detectors;

FIG. 7 is a plan view of an areally subdivided reticle which may be employed in the arrangement of FIG. 6;

FIG. 8 is a diagrammatic representation of various waveforms which arise in the operation of the arrangement of FIG. 6.

Figure 1:
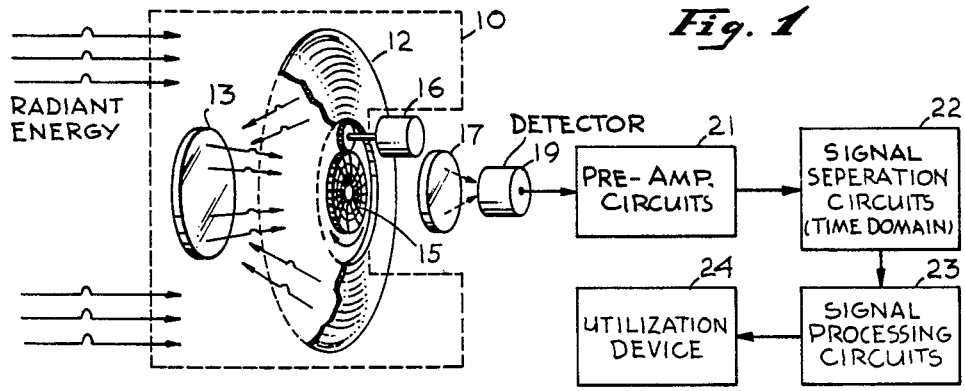

Referring now to FIG. 1, a radiant energy analyzing system may, in accordance with the invention, derive radiant energy from a field of view through a collector lens system 10 comprising a primary reflector 12 which directs impinging radiation against a secondary reflector 13. Both of the reflectors 12, 13 are most often concentric with the optical axis of the system, and both cooperate to provide a two-dimensional image of the field of view at an image plane at which is positioned a reticle 15 providing different frequencies, in accordance with the invention. The variable transmissivity pattern on the reticle 15 is shown only in generalized form in FIG. 1. The reticle 15 preferably is rotated about the optical axis by a circumferential drive means coupled to a motor 16.

The radiant energy transmitted through the reticle 15, including the time varying functions introduced by the variable transmissivity patterns of the reticle is concentrated by a field lens system 17 (shown only generally) so as to fall upon a detector 19.

The electrical signal generated at the detector 19 represents, in the time domain, the spatial distribution of the radiant energy transmitted by the reticle across the field of view. That signal is passed through preamplifier circuits 21 which are sufficiently wide band to encompass the different desired frequencies in the time domain which may be introduced by the different space frequencies. Thereafter, the preamplified signals are applied to signal separation or demodulation circuits 22 which are responsive in a preselected manner to the different time varying components of the signal generated by reticle 15 and detected by element 19. In one arrangement, the signal separation circuits 22 may comprise frequency sensitive filters, while in another arrangement they may comprise signal sampling circuits which operate on a predetermined time dependent basis. After the signal separation has been accomplished, the information content of the signals is used in signal processing circuits 23 to control a utilization device or devices 24. For example, the utilization device 24 may comprise a tracking system, a servo mechanism for maintaining the target being tracked in the field of view, together with appropriate display equipment and information processing circuits. With a surveillance system the utilization device 24 may consist solely of a display, or with an optical test bench the utilization device will primarily consist of indicating meters and recording equipment.

As has been indicated above, a primary feature of systems employed in accordance with the invention arises from the use of different patterns on the reticle to provide different time and space frequency modulation, either simultaneously or sequentially, along with signal processing in the time domain which corresponds to the particular modulation or chopping introduced by the reticle.

Figure 2:
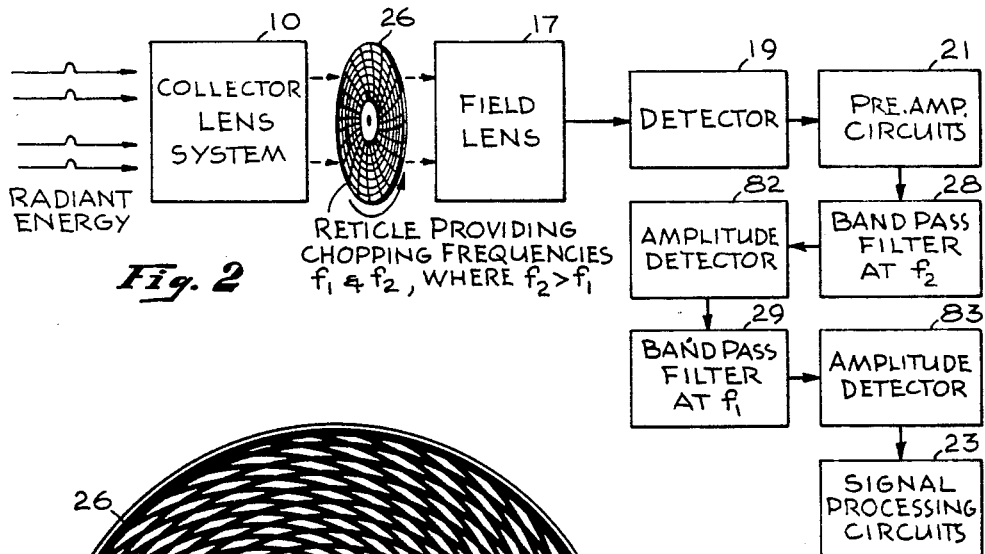
FIG. 2 is combined block diagram and perspective representation of a radiant energy analyzing system using a reticle having superimposed patterns.
Figure 3:
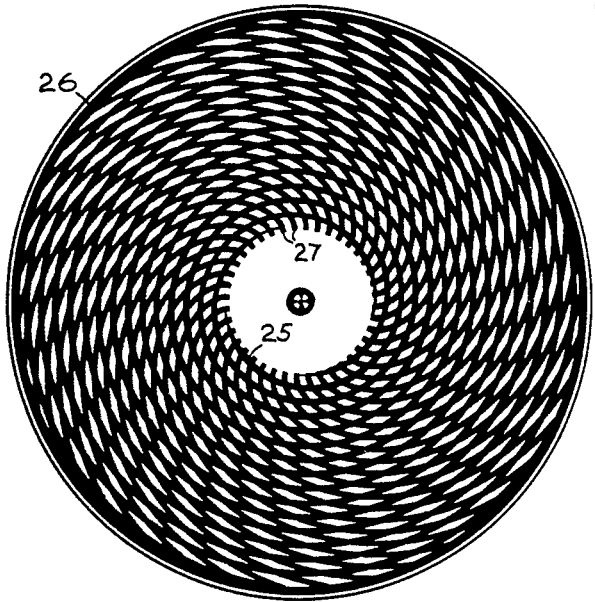
FIG. 3 is an enlarged representation of one form of reticle bearing superimposed patterns, which may be employed advantageously in the arrangement of FIG. 2.

An example of a surveillance system in accordance with the invention which identifies point sources of radiation and discriminates against extended line sources is shown in FIG. 2, with a detailed view of the reticle being shown in FIG. 3. The radiant energy collected by the lens system 10 and focused by the field lens 17 on the detector 19 is chopped by an interposed reticle 26. The reticle 26 contains two different superimposed spoke patterns, as best illustrated in FIG. 3. The space frequencies represented by each of the patterns may be approximately the same, but the chopping frequencies which are introduced by the reticle rotation are materially different. Further, at each point of intersection between the spokes of one pattern and spokes of the other pattern, the spokes define a substantially oblique angle. Additionally important is the fact that, as best seen in FIG. 3, the spokes may be involute curves; an involute being defined as the curve traced by any one point of a perfectly flexible inextensible thread as it is wound upon on unwound from another curve. Accordingly, an involute originates on a plane closed curve which is sometimes referred to as the evolute. Because the two sets of spokes emanate from different evolutes, they provide different chopping frequencies for any point source which is represented in the field of view. The resultant chopping frequencies may be referred to as frequencies $f_1$ and $f_2$, with $f_2$ being the higher frequency. More specifically, and with reference to FIG. 3, the light transmitted from a point source through the reticle 26 will be modulated in intensity at a first frequency $f_1$ dependent upon the number of the more nearly tangential involute curves 25 and will be intensity modulated or "chopped" at completely different carrier frequency $f_2$ corresponding to the circumferential number of the more nearly radial involutes 27. Thus in response to a point source the detector 19 of the system of FIG. 2 produces an alternating current output signal having a carrier frequency $f_2$ and an amplitude modulation frequency $f_1$. Contrast the effect of the dual frequency reticle 26 on the signal derived from an extended line source: Suppose a special case extended source in the form of an involute line which is parallel to the more nearly radial involutes 27 of the reticle. As the reticle rotates, this light source will first appear between two of the involutes 27 and a maximum intensity will be transmitted to the detector 19. A a later instant, this line source will be completely intercepted by one of the involute curves 27 and the radiation instantaneously transmitted will fall to zero. Thus the supposed special case source causes detector 19 to generate carrier signal of frequency $f_2$ which is completely unaffected by the involutes 25 and is therefore not modulated at the low frequency $f_1$. Such a signal will be translated to and through the carrier frequency filter 28 and will be detected by demodulator 82 to produce a steady state D.C. voltage at the output thereof. Modulation frequency band-pass filter 29, being constructed and arranged to pass only the band encompassing the frequency $f_1$ will reject the above noted D.C. output from detector 82. In that manner the system of FIG. 2 discriminates against the particular special case line source which has been considered. By similar reasoning, it may be appreciated that the system of FIG. 2 will discriminate against, or attenuate, the signal from any line source or large area source in favor of the signal from a point source.

Signals provided from the second band-pass filter 29 are applied, after detection by the detector 83, to the signal processing circuits 23, from which indications of the presence of a point source in the field of view are provided.

The arrangement of FIG. 2 has only one moving part, the reticle 26, and its movement is confined to a simple rotation. Nonetheless, this surveillance system may scan a wide field of view, and may detect substantially all point sources in the field of view irrespective of their location within the field. The output signal provided to the signal processing circuits 23 undergoes an appreciable amplitude variation only in response to detection of point sources of radiant energy. Background noise, which appears as an essentially constant energy input at the detector 19 is substantially eliminated by the first band-pass filter 28. Similarly, as explained heretofore, extended line sources, such as cloud edges, the horizon, and the like will be chopped to an appreciable extent by one of the patterns on the reticle 26, but substantially little by the other. The combined operation of pre-detection filter 28 and post-detection filter 29 has the effect of substantially eliminating signal components derived from such line sources. In other words, by sequential filtering, first at the high carrier frequency by means of filter 28 and subsequently, after envelope demodulation, at the modulation frequency, by means of filter 29, it is possible to discriminate against all extended or line sources with a system employing a single reticle element. Line sources which are chopped at the higher frequency, $f_2$, are not chopped at the lower frequency, $f_1$. Accordingly, the essentially constant or relatively slow varying components of the signal applied to the second band-pass filter 29 are rejected, so that the system discriminates in favor of point sources as against such extended line sources.

Extended line sources which are chopped only at the lower frequency, $f_1$ will fail to produce a carrier signal of the frequency $f_2$. Consequently, line sources with this orientation generate time varying components which are rejected by the first band-pass filter 28.

The present system, while being remarkably free from mechanical and electrical complexities, is nevertheless effective to provide simultaneous space filtering which is effective in two dimensions. Furthermore, the system permits use of involute patterns, thus deriving the material advantages which are possible with such patterns. For example, the spatial frequency discrimination is constant throughout the field of view, and the chopping frequency also remains the same.

Figure 4:
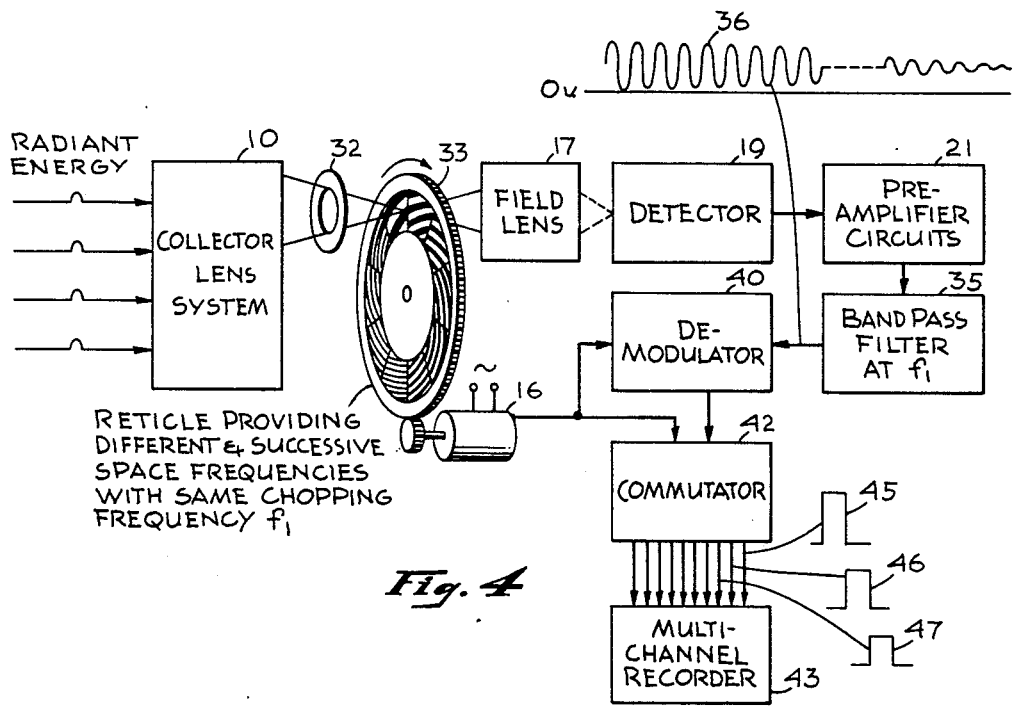
FIG. 4 is a combined block diagram and perspective representation of a different form of radiant energy analyzing system using a segmented reticle having different space frequencies.

As signal analyzing systems, arrangements in accordance with the invention provide a number of novel capabilities. One such system which may be used for example in determining true blur circle size in a optical test bench, is shown in FIG. 4. Radiant energy derived from an external source is directed through the collector lens system 10 and a diaphragm 32 upon a pattern bearing region of a reticle 33. For purposes of determining blur circle size, the radiant energy source is arranged as an effective point source, although for other applications the sources will be of unknown size and shape. In the embodiment of the invention of FIG. 4, the reticle 33 is multiply segmented (see FIG. 5) about an annulus concentric with its axis of rotation. The spoke patterns in each of the segments vary progressively about the reticle 33, although the slopes and widths of the spokes are changed in each segment or sector to provide like chopping or modulation in the time domain. The chopping frequency with a selected rotational speed for the reticle 33 may therefore be regarded as frequency $f_1$, regardless of which peripheral segmental portion is instantaneously operative.

The reticle 33 therefore provides progressively different space frequencies in the various sectors about the reticle. The diaphragm 32 restricts the view, with respect to the reticle 33, to a circle in the pattern containing area, and the radiant energy is, after chopping, concentrated by the field lens 17 so as to fall on the detector 19.

As in the arrangement of FIG. 1, the reticle 33 is rotated by a motor 16, although here it is also desired to provide time reference signals by which the signals corresponding to the various sectors may be individually recovered. Inasmuch as the rotational position of the motor 16 is directly related to the rotational position of the reticle 33, an appropriate reference signal is derived from the motor 16. It will be recognized that alternatively the reference signal to identify the different sectors may be derived from the sensing of appropriate marks on the reticle 33 itself, and that these time varying signals may also be used to control demodulation of the chopped signals derived at the detector 19.

After preamplification in the circuits 21, therefore, the time varying components which represent the output signal from the detector 19 are applied to a band-pass filter 35 which may have a limited pass band at the chopping frequency $f_1$. Although the output signal derived from the filter 35 provides the same frequency throughout a cycle of rotation of the reticle 33, the amplitude of the signal varies in accordance with the relationship between the blur circle size and the space frequency which is reinforced at the reticle 33. The radiant energy source which appears as a point (that is, of zero angular extent) theoretically is chopped with equal efficiency by all space frequency patterns. Actually, of course, most sources have some angular extent, although in any event the inevitable aberrations in an optical system result in a degree of widening of the point source. The degree of widening, which is determinative of the blur circle size, is a measure of the efficiency and the characteristics of the optical system. Knowledge of blur circle size is of great importance, because it is often desired to use as high a spatial frequency or angular resolution as is feasible and consistent with obtaining full modulation of the point sources.

Figure 5:
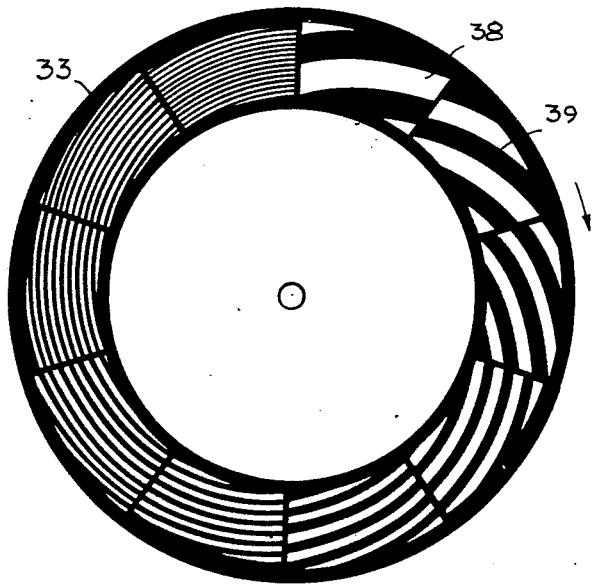
FIG. 5 is a plan view of a reticle having different space frequency segments which may be employed in the arrangement of FIG. 4.

The illustrative waveform 36 which is shown at the output terminal of the band-pass filter 35 represents a condition in which the blur circle size is appreciable, and is optimum for the widest spoke width sector of the reticle 33. Referring to FIG. 5, this means that the spokes of the sector 38 fully modulate the projection of the point source, thereby providing a pulse group of almost 100% intensity at the chopping frequency. The spokes of the next adjacent sector 39 are only slightly smaller, and so modulate the point source again to a somewhat lower intensity. As the reticle 33 rotates and the subsequent sectors are scanned past the field of view, the amplitude of the modulation decreases as the chopping effect is lowered until the last sector, in which the narrowest spokes are present, has a virtually zero modulation efficiency.

In order to determine the relative amplitude excursions of the signals derived from the band-pass filter 35 in correspondence to the various sectors of the reticle 33, the signals are applied to a demodulator 40 which uses the time reference signals and provides amplitude varying pulses in series to a commutator circuit 42 which is also controlled by the time reference signals derived from the reticle drive means. In the present example it is merely desired to observe the relationship between the modulation efficiencies of the different sectors of the reticle. This is conveniently done by using a different terminal of the commutator 42 for the signals representative of each one of the sectors, and recording for observation the amplitudes of the signals derived from each sector through use of a multichannel recorder 43. For the example given, the pulse on a first line from the commutator 42 is of highest amplitude, as shown by the illustrative waveform 45. The next derived pulses on the succeeding channels, represented by the waveforms 46, 47 successively decrease in amplitude for the example given.

Where modulation efficiency remains at 100% until some intermediate spoke size is encountered, blur circle size and modulation efficiency are as readily identified by a dropoff in the signals from the system, beginning with the signal derived from a specific one of the sectors of the reticle 33.

For other applications, appropriate modifications may be readily made to correspond to the desired use. For example, when the size of a target is known in advance, the successive segmentation of the reticle in a manner which provides different space frequencies permits the range of the target from the system to be determined. Conversely, knowing target range, the size of the target may be identified. Since the operation of a system in accordance with the invention does not depend upon relative signal strength, which is subject to wide variations with changes in atmospheric conditions, glint, combustion irregularities, and background noise, techniques in accordance with the invention may be used in determining a pursuit or closing course with an accurate determination of the rate of closure being feasible.

Track-while-scan applications of system in accordance with the invention may advantageously utilize the aforementioned features of the invention. In one such system, illustrated in general form in FIG. 6, radiant energy is directed in a lens system 10 and field lens 17 onto a mosaic of detectors 48. The total field of view is subdivided by collector lens systems 10 into separate fields of view which are focused on an aerally subdivided reticle 50. The areal subdivision are here concentrically disposed about a central axis of rotation of the reticle 50, the drive means being omitted for simplicity in the representation. As shown, the reticle 50 has three different radial zones, the outer zone containing ten subdivisions, the intermediate zone containing six subdivisions, and the central zone consisting of a single areal pattern.

Phase reference signals which are representative of the angular displacement of an areal subdivision at any instant in time may be derived in any of a number of conventional ways. For example, a phase reference pattern may be superimposed in a peripheral track on the reticle disk 50 and reproduced by a photo-sensitive detector during rotation of the reticle 50. Alternatively, an element driven in synchronism with the reticle 50 may be used to generate the signals. Such means are indicated in block diagram form as a phase reference signal source 51 disposed adjacent the reticle 50.

Each areal subdivision within reticle 50, referring now particularly to FIG. 7, includes a pair of superimposed variable transmissivity patterns. The spokes 52 of one pattern are disposed at some oblique angle relative to the spokes 53 of the other pattern. In the example shown, quasi-involute spokes 52 within the subdivision provide a central chopping frequency $f_1$. These spokes 52 are at least partially transverse to radial spokes 53, which provide a relatively constant chopping frequency $f_2$.

The quasi-involuted spokes 52 may be so termed, because the widths of the spokes are essentially constant. Within the field of view of a given areal subdivision, however, the chopping frequency introduced by the spokes 52 deviates from the frequency $f_1$ by an amount which is dependent upon the radial positions selected. In other words, the radial position of a point source in the field of view, as roughly defined by the outer bounds of the areal subdivision, determines the deviation ratio of the frequency modulated component of the $f_1$ carrier. The angular position of a point source within the field of view may be determined by using the reference signal, discriminating the frequency modulated component of the $f_1$ carrier, and measuring the phase difference between the reference signal and the discriminated frequency modulated signal.

It will be recognized that the frequency modulated signal patterns resulting from an areal subdivision are repeated $n$ times around a reticle, where $n$ is the number of nutation periods. $f_n$ is therefore the nutation cycle, and $$f_n = \frac{N}{n}$$

where N is the revolutions per second of the reticle. $n$ also equals $$\frac{2\pi}{\alpha_0}$$

where $\alpha_0$ is the angular displacement of the areal subdivision. The inner radial rings of patterns in the mosaic of the detectors of course have different values of $n$. The period for modulation of a given point source is $1/f_n$. Where the deviation from the carrier $f_1$ reaches its highest value, the period is $$\frac{1}{f_1} + \Delta f_{max}$$

and where it reaches its lowest frequency, the period is $$\frac{1}{f_1} - \Delta f_{max}$$

Typical values for a reticle 50 may be given as follows. The number of spokes for the carrier $f_1$ may be about 180 while for the higher chopping frequency $f_2$ approximately 900 spokes may be used. Then, the following rates and values may be employed:

$f_n$=180 c.p.s.      $f_2$=18,000 c.p.s.
$f_1$=3.600 c.p.s.      $n$=9
$\Delta f_m$=±1,000 c.p.s.      $N$=20 r.p.s.

Returning again to the system arrangement of FIG. 6, each of the detectors in the mosaic of detectors 48 is coupled to a set of signal processing circuits which provide surveillance as well as tracking or locating functions within the field of view. Signals from the detector are coupled to preamplifier circuits 21 which are in turn coupled to a band-pass filter 55 which is centered at the higher chopping frequency $f_2$. The envelope of the signal derived at the higher chopping frequency $f_2$ is provided from an amplitude detector 57 to a band-pass limiter and filter 58. The band-pass limiter and filter is centered at the lower frequency carrier $f_1$, and has a sufficiently broad bandwidth to encompass all expected deviations in the frequency modulated signal. The frequency modulated signal is then applied to an FM discriminator 60, the relatively slowly varying output signal from which is supplied to a phase and amplitude demodulator 61 which is also controlled by the phase reference signals from the source 51. The output signals from the phase and amplitude demodulator 61, which represent the radial and circumferential components of radiant energy sources within the field of view for the particular selected detector in the mosaic of detector, controls a utilization device 63 by means of which the tracking and scanning functions may be carried out in known fashion.

The operation of the system of FIG. 6 and the reticle of FIG. 7 may best be understood by reference to the simplified waveforms of FIG. 8 which illustrate the signal variations encountered as a point source scans a given radial position within a field of view represented within a given subdivision, at a selected radial position and in a given angular displacement within the field. The waveforms represent one full period of the nutation cycle $f_n$.

The point source which is present in the total field of view at some region is therefore focused into the limited field of view associated with some individual detector in the mosaic 48. Point sources are chopped in two directions by the spokes 52, 53 which scan across the point source as each subdivision of the reticle 50 in the ring in which the point source is located is cycled by the field of view. Although effective discrimination is obtained against extended line sources in all directions, the signal having the information content needed for tracking while simultaneously scanning is derived from the processing circuits.

The amplitude modulated signal from a radiation detector, after passing through the preamplifier circuits 21, is filtered in the first band-pass filter 55. Because of the deviation introduced into the quasi-involute spokes 52, a cyclic variation is introduced in the lower frequency carrier $f_1$. Concurrently, the higher chopping frequency $f_2$ is superimposed upon, and effectively modulated with, the lower frequency carrier. Accordingly, as shown at (A) in FIG. 8, the periodicity of the wave at the lower carrier varies from $$\frac{1}{f_1 + \Delta f_{max}}$$

to $$\frac{1}{f_1 - \Delta f_{max}}$$

and back to $$\frac{1}{f_1 + \Delta f_{max}}$$

within a single nutation cycle. The higher frequency components have the constant period $1/f_2$. The time varying signal (A) which is derived at the output terminal of the band-pass filter 55 varies in accordance with the radius, $r$, and the angular displacement, $\theta$, within the limited field of view, in accordance with the following expression:

$$(A) = \sin 2\pi f_2 t \left[ \sin \left( 2\pi f_1 t + \frac{K_r}{f_n} \cos 2\pi f_n t + \theta \right) \right]$$

The envelope of the time varying signal appearing at the output terminal of the band-pass filter 55 is extracted by an amplitude detector 57. This wave, shown at (B) in FIG. 8, is frequency modulated within the nutation cycle. After application to the band-pass limiter and filter 58, which are centered at $f_1$, a square wave having a like time modulation and representing the frequency modulation information is derived, as shown at (C) in FIG. 8.

The signal still contains the essential information derived from the output signal (B) from the amplitude detector 57, the expression for which no longer contains the high frequency component $f_2$;

$$(B) = \sin \left( 2\pi f_1 t + \frac{K_r}{f_n} \cos 2\pi f_n t + \theta \right)$$

The signal shown at (C) in FIG. 8 is applied to the FM discriminator 60, and an amplitude varying component representative of the deviation of the frequency from the nominal carrier $f_1$ is derived, as shown at (D) in FIG. 8. The signal (D) is dependent only upon the radial and angular displacement of the source within the field of view for its characteristics. Stated in another way, the amplitude of the deviation is dependent upon the radius, $r$, while the phase relationship of the variation to a phase reference is dependent only upon the angular displacement, θ, within the field of view. Application of this signal to the phase and amplitude demodulator 61, together with the phase reference signals from the source 51, therefore permits generation of signals for the utilization device 63 which represent the position of the source within the field of view associated with the specific detector for which the circuit is shown. Like processing circuitry for each of the other detectors permits generation of like signals throughout the total field of view.

A number of advantages should be noted in conjunction with the system of FIG. 6. There is not only good discrimination against extended line sources in any direction, but also there is good spatial filtering for every position within the field of view. In addition, the arrangement tracks in the center of the total field of view, as well as in the center of each individual field of view. The mechanical arrangement is extremely simple, and the electrical circuit components do not involve any critical factors. In addition, the carrier frequency is suitably high for good electrical operation.

Certain alternatives and operating factors will be appreciated by those skilled in the art. The multiple frequency patterns may be varied, for example, so as to use true involutes or non-involutes where convenient. Other factors than those discussed in conjunction with FIGS. 6 and 7 may be deviated to introduce signal components from which radial and angular displacement may be identified. The optical systems for the track-while-scan system should be designed such, that, for ambient backgrounds, the reticle-field terminates at the null of the amplitude function. This is conveniently done by blurring the edge of the image by having the field stop offset from the focal plane, or by serrating the edges of the field stop so as to provide a gradual transition from the region of no transmission to that wherein information is desired.

Figure 9:
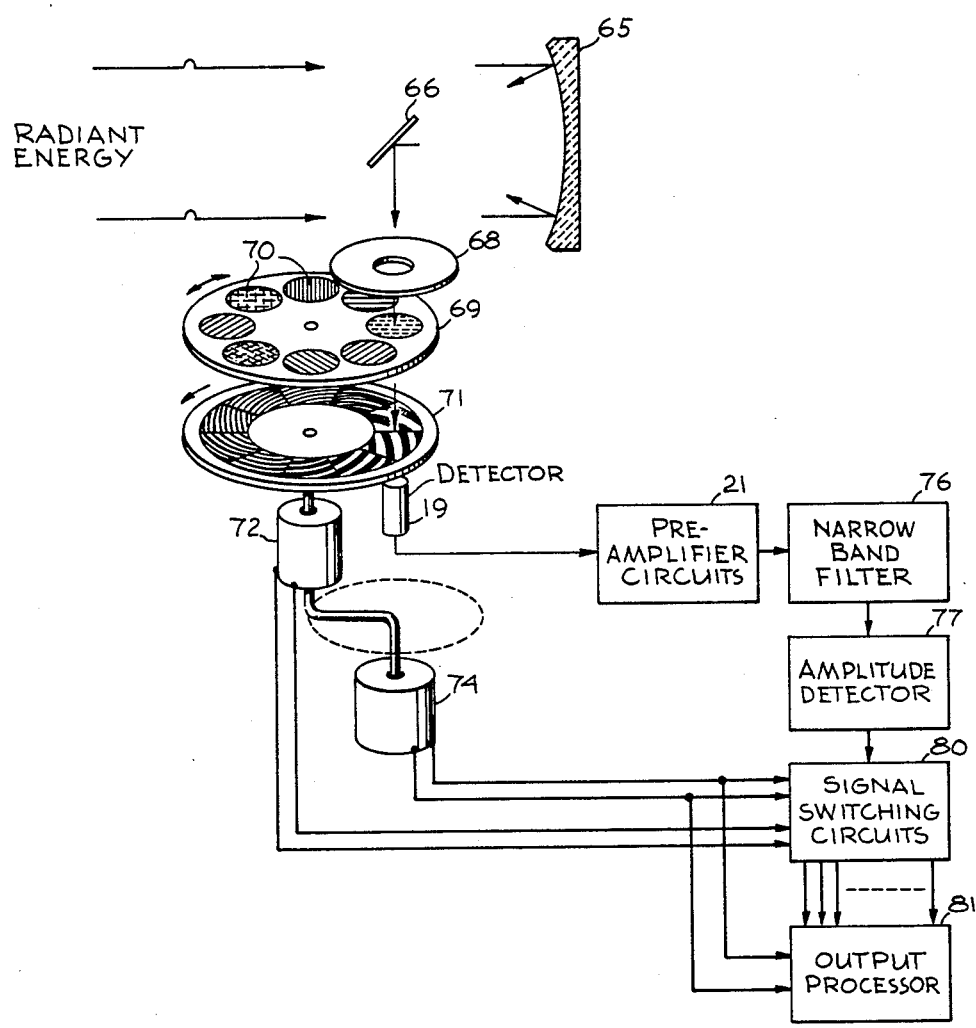
FIG. 9 is a combined block diagram and perspective view of a different form of radiant energy analyzing system.

An optical analyzing system in accordance with the invention which provides particular versatility and accuracy in the analysis of radiant energy in a particular frequency range of interest is shown in FIG. 9. Incident radiant energy, concentrated by successive primary and secondary collectors 65, 66 respectively is directed through a reticle-field stop 68 which limits the field of view. The radiation may then be directed through an optical filter wheel 69 having filters 70 which are selected to pass different radiation wavelengths or frequency bands. A positioning mechanism, such as a detent mechanism (not shown) may be arranged to place any of the selected filters 70 in the path of the collected radiation, so as to limit the subsequent processing to the selected frequency band alone.

Thereafter, the radiant energy impinges on a multiple segment reticle 71, as described above in conjunction with the arrangement of FIG. 5. The reticle 71 has a plurality of different patterns which provide varying space frequencies but a like chopping frequency. Successive movement of the patterns past the field of view is accomplished by a drive motor 72, but the reticle 71 may also be arranged to be planetated progressively about the field of view. Planetation is effected by rotation of the reticle 71 about the selected optical axis under the actuation of a drive motor 74. As the reticle 71 is planetated at a relatively slower rate than the rate of rotation, the spokes of the different patterns on the reticle 71 act to chop the field of view in different directions which progressively change during the planetation. Throughout all these positions, an electrical signal is generated by a detector 19, and amplified in preamplifier circuits 21.

The amplified signals are then applied to a narrow-band filter 76 which is selected to pass frequencies at the chopping frequency imposed by the reticle 71, and subsequently the envelope of the signals is extracted by an amplitude detector 77 and applied to signal switching circuits 80. As in the arrangement of FIG. 4, these signal switching circuits 80 provide a commutation of the signals from the single input channel to successive ones of a number of output channels. The reference signals by which this switching is accomplished are derived from both the motors 72, 74, because of the complex motion of the reticle 71 during its rotation and planetation. Accordingly, the signals applied from the switching circuits 80 to an output processer 81 represent successively different space frequency reinforcements, for each position of the reticle 71 during a single rotation, and successively different chopping directions as the reticle 71 is planetated.

The output processer 81 may be multi-channel recorder, an analog-to-digital converter, together with subsequent digital recorders, or other forms of signal recording and analyzing systems.

The system of FIG. 9 thus permits analysis of a number of different characteristics of a radiant energy source, namely, size, shape, orientation and spectral energy distribution. Knowing the filter 70 which is in position, the frequency range under analysis is known. As in the arrangement of FIG. 4, changes in the relative amplitudes of the signals derived from each of the successive segments on the reticle 71 signals are provided in the separate output channels which are truly representative of size, and by the relationship to each other at successive periods of time, or relative changes in size.

The shape and orientation of a radiant energy source, as well as changes in the shape and orientation are revealed by the pattern of changes occurring duration a planetation cycle. This arrangement therefore provides unique capabilities for the derivation of information from radiant energy sources, as well as the characteristics of optical systems, background effects and the like.

In the areally subdivided system of FIG. 6, the multiple frequency reticle may also be employed for either pulse duration modulation, or pulse duration modulation in combination with frequency modulation. The areal subdivision may be further divided by an approximately diagonal line into two segments having different chopping or space frequencies. The chopping frequency of one of these segments may, of course, be zero. The segment within which chopping is accomplished results in the generation of an oscillatory signal which has a duration which is dependent upon the radial position of the point source in the field of view. The angular position of the point source in the field of view may be determined by comparison of the phase relationship of the chopped signal to some phase reference. This constitutes pulse duration modulation of a form which is suitable for generating tracking signals.

A segment of the reticle which has just been described may then, in accordance with the invention, be provided with two patterns, representing different space frequencies and having their spokes at oblique angles relative to each other. Such an arrangement provides a combination of pulse duration modulation with frequency modulation, discrimination against extended line sources in any orientation, and full information needed for tracking as well as surveillance. If involutes are employed, the spatial filtering is constant irrespective of the radial position of the point source in the field of view.

Although a number of different arrangements have been discussed in conjunction with the derivation of information relative to a radiant energy source, or the analysis of characteristics of an optical system, it will be appreciated that the invention is not limited thereto. Accordingly, the invention should be considered to include all modifications, variations and alternative forms falling within the scope of the appended claims.

The embodiments of the invention in which an exclusive property or privilege is claimed as defined as follows:

1. An optical reticle for radiant energy systems which includes at least two different involute patterns disposed about a central axis, the involute patterns each being defined by spokes of different radiant energy transmissivity.

2. A reticle for use in a radiant energy detection system in which a field of view is imaged on the reticle in a focal plane, said reticle comprising a disk having at least two distinct variable transmissivity patterns thereon, each of the patterns having sectors which are alternately substantially transparent and substantially opaque to radiant energy and defined by a plurality of separate involute curves originating from a plane closed curve centrally disposed with respect to said disk, the involute curves of each of the patterns having different frequency characteristics.

3. A reticle for use in a radiant energy detection system wherein the reticle is rotated about a central axis for modulating radiant energy imaged on a radial area thereof, comprising a reticle disk having a number of patterns disposed thereon in separate circumferential areas about a central axis of rotation, there being a different involute pattern in each of the circumferential areas, each of the patterns being selected to provide a different space frequency reinforcement.

4. A reticle for use in a radiant energy detection system in which a field of view is imaged on a focal plane wherein the reticle is rotatably positioned about a central axis for modulating the imaged radiant energy comprising a reticle disk having a number of separate patterns disposed in different circumferential areas about a central axis of rotation, there being a different pattern within each circumferential area, each one of the different patterns having alternate opaque and transparent sectors, the boundaries of which are defined by the involutes of a plane closed curve, with the involutes of each of the different patterns being different, the size and slope of the involutes with respect to the disk being selected such that each pattern provides reinforcement of a different space frequency and a selected chopping frequency for an imaged point source.

5. An optical reticle for radiant energy systems, characterized by a pair of patterns disposed about a central axis of the reticle, the pair of patterns being at least partially coextensive in area and both being individually defined by involute spokes which lie at an oblique angle relative to the spokes of the other pattern.

6. An optical reticle for radiant energy systems, characterized by a pair of involute patterns disposed about a central axis of the reticle, the pair of patterns being substantially coextensive in area and each being defined by involute reticle segments of alternately different radiant energy transmissivity, the curvilinear attitude of the involute segments of one pattern being different from the curvilinear attitude of the involute segments of the other pattern, such that a point source of radiant energy imaged on the reticle in the area of the pattern is simultaneously chopped at different time frequencies.

7. An infrared reticle capable of discrimination against extended line sources having any orientation relative to the reticle, the reticle including
  a body adapted to be rotated about a central axis, the body being substantially transparent to infrared radiation, and
  indicia means disposed on the body about the central axis for defining a pair of different time frequency patterns having substantially like space frequency, the patterns each consisting of alternately varying light transmissivity involutes.

8. A reticle for use in a radiant energy system employing a mosaic of detectors and a number of individual fields of view within a total field of view, each individual field of view being associated with different detectors, the reticle consisting of a centrally rotatable member having a number of areal subdivisions each areal subdivision having at least two variable light transmissivity patterns disposed thereon, the spokes of each of the patterns being oblique relative to the spokes of the other pattern, and the two patterns providing different chopping frequencies.

9. A reticle for use with a track-while-scan infrared system using a mosaic of detectors disposed in rings about a central axis, the reticle comprising
  a disk body rotatably mounted on the center axis and transparent to infrared energy, and
  a number of variable transmissivity patterns disposed in rings corresponding to the rings in the mosaic of detectors concentrically about the central axis, each of the rings being areally subdivided to correspond to individual fields of view, each of the areal subdivisions having at least two superimposed patterns thereon, each of the patterns being defined opaque spokes, the spokes of at least one of the patterns being oblique with respect to the spokes of at least one other of the patterns.

10. The invention as set forth in claim 9, wherein the spoke of one of the patterns in each of the areal subdivisions are radially disposed relative to the central axis, and wherein the spokes of the other pattern in the areal subdivision are quasi-involutes having a deviation circumferentially with respect to the areal subdivision such that a frequency modulation component is introduced at the chopping frequency of the quasi-involutes, and wherein the first mentioned pattern provides a higher chopping frequency than the second mentioned pattern.

11. The invention as set forth in claim 9, wherein there are three separate patterns within each areal subdivision, the areal subdivision being divided into radial and circumferential halves, there being two superimposed patterns within one of the halves, with the spokes of one of the patterns lying oblique relative to the spokes of the other of the patterns.

References Cited in the file of this patent

UNITED STATES PATENTS

| | | |
|---|---|---|
| 2,931,912 | Macleish | Apr. 5, 1960 |
| 2,961,545 | Astheimer et al. | Nov. 22, 1960 |
| 2,972,276 | Whitney | Feb. 21, 1961 |
| 2,996,745 | Davis | Aug. 22, 1961 |
| 3,034,405 | Biberman et al. | May 15, 1962 |